(No Model.) 7 Sheets—Sheet 1.
J. W. BALET.
ELECTRIC CURRENT REGULATOR.
No. 398,926. Patented Mar. 5, 1889.
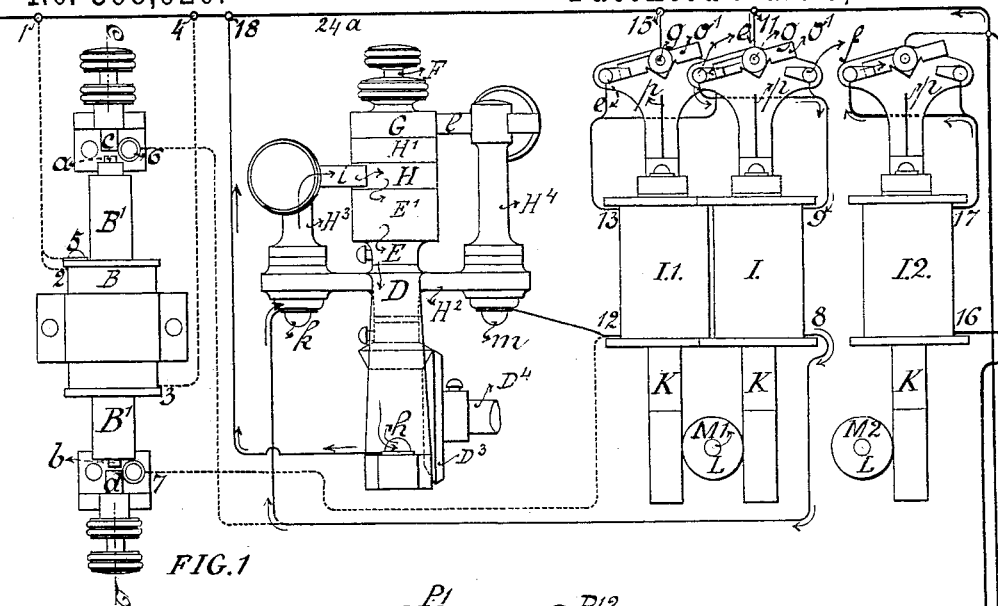
FIG.1
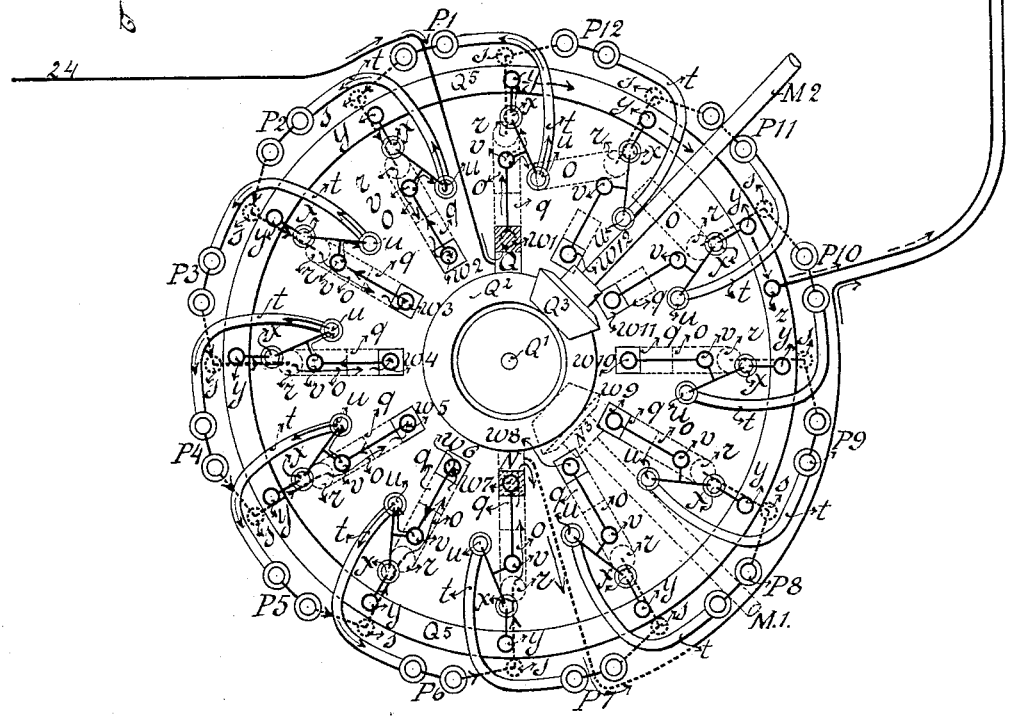
FIG.6
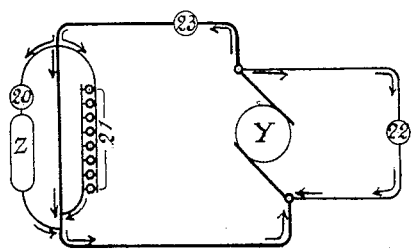
WITNESSES: C. Sedgwick, J. M. Ritter
INVENTOR: J. W. Balet
BY Munn & Co.
ATTORNEYS.

(No Model.) 7 Sheets—Sheet 2.

J. W. BALET.
ELECTRIC CURRENT REGULATOR.

No. 398,926. Patented Mar. 5, 1889.

WITNESSES:
C. Sedgwick
Wm. W. Duyster

INVENTOR:
J. W. Balet
BY Munn & Co.
ATTORNEYS.

(No Model.) 7 Sheets—Sheet 3.
J. W. BALET.
ELECTRIC CURRENT REGULATOR.
No. 398,926. Patented Mar. 5, 1889.
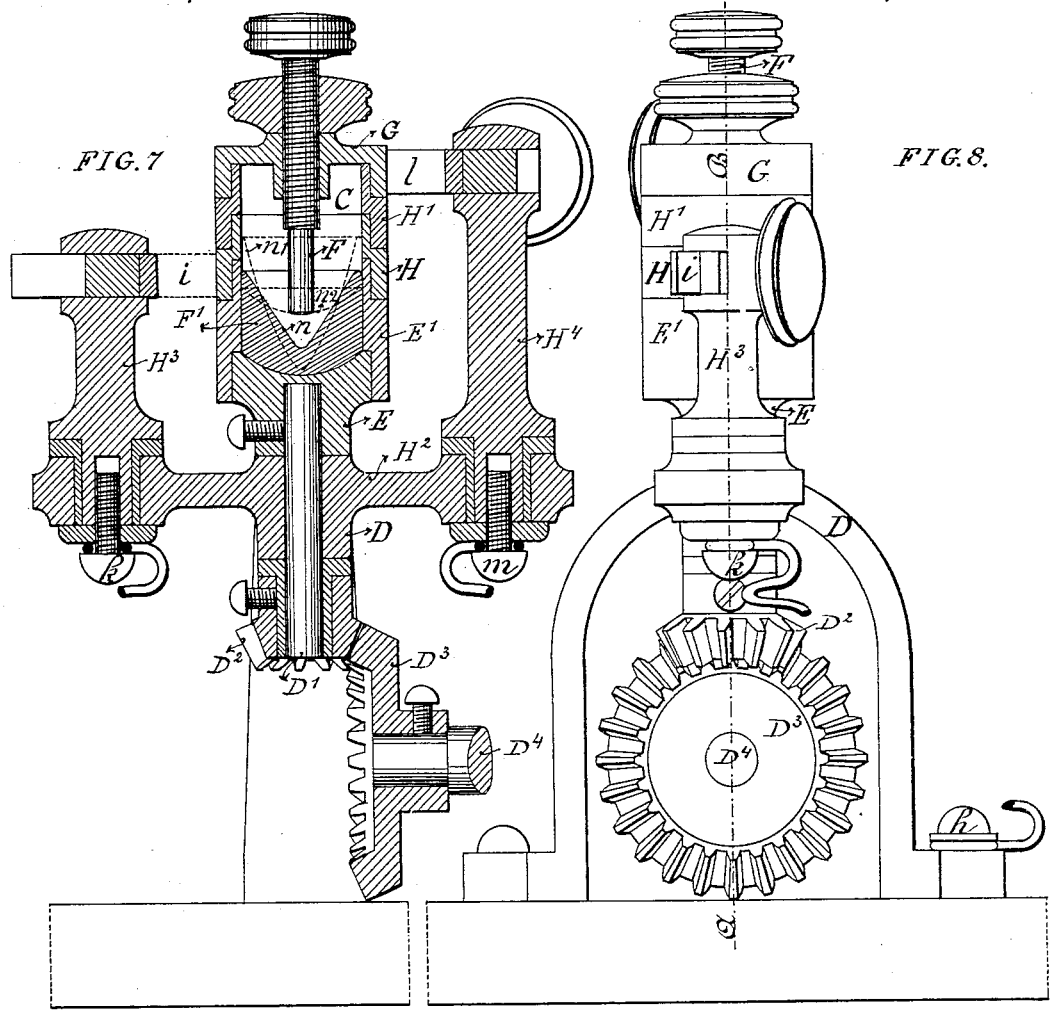
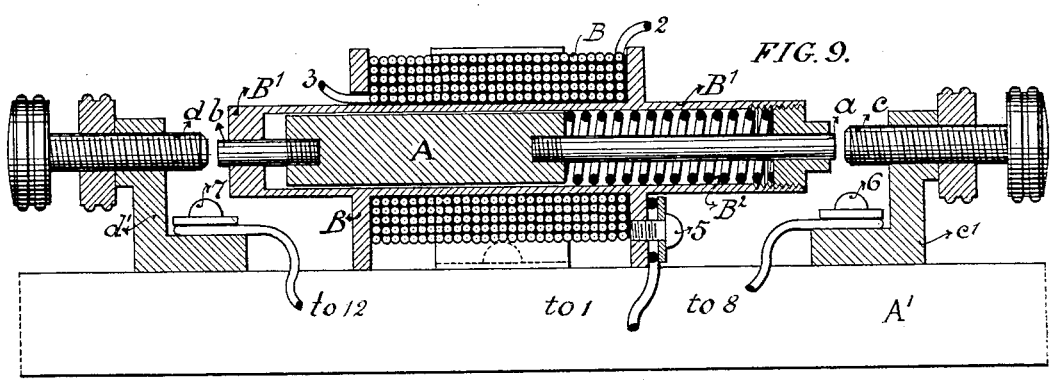
WITNESSES:
C. Sedgwick
J. M. Ritter
INVENTOR:
J. W. Balet
BY Munn & Co.
ATTORNEYS.

(No Model.) 7 Sheets—Sheet 4.
J. W. BALET.
ELECTRIC CURRENT REGULATOR.
No. 398,926. Patented Mar. 5, 1889.
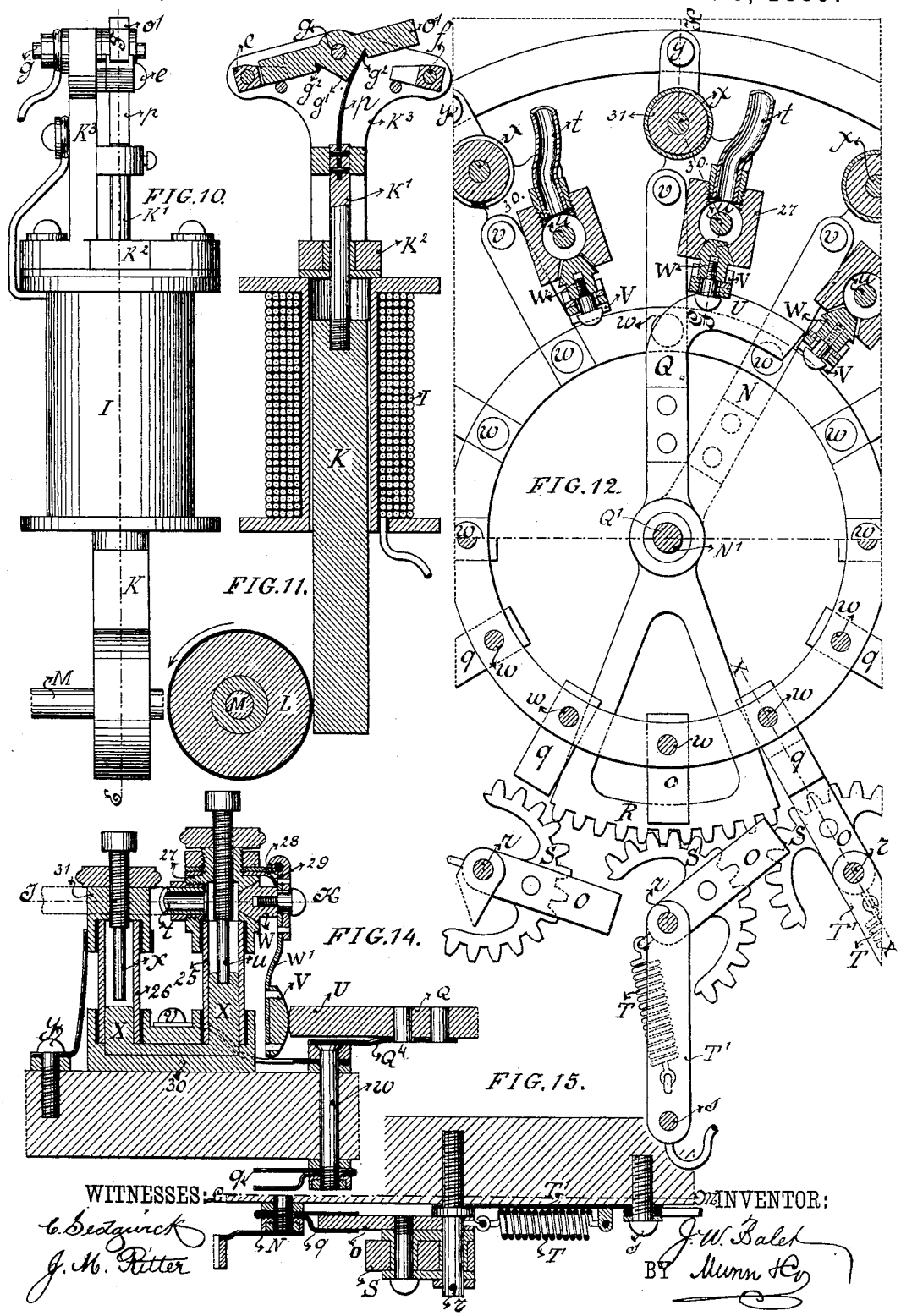

(No Model.)  7 Sheets—Sheet 5.

J. W. BALET.
ELECTRIC CURRENT REGULATOR.

No. 398,926.  Patented Mar. 5, 1889.

WITNESSES:
C. Sedgwick
J. M. Ritter

INVENTOR:
J. W. Balet
BY Munn & Co.
ATTORNEYS.

(No Model.) 7 Sheets—Sheet 7.
J. W. BALET.
ELECTRIC CURRENT REGULATOR.
No. 398,926. Patented Mar. 5, 1889.
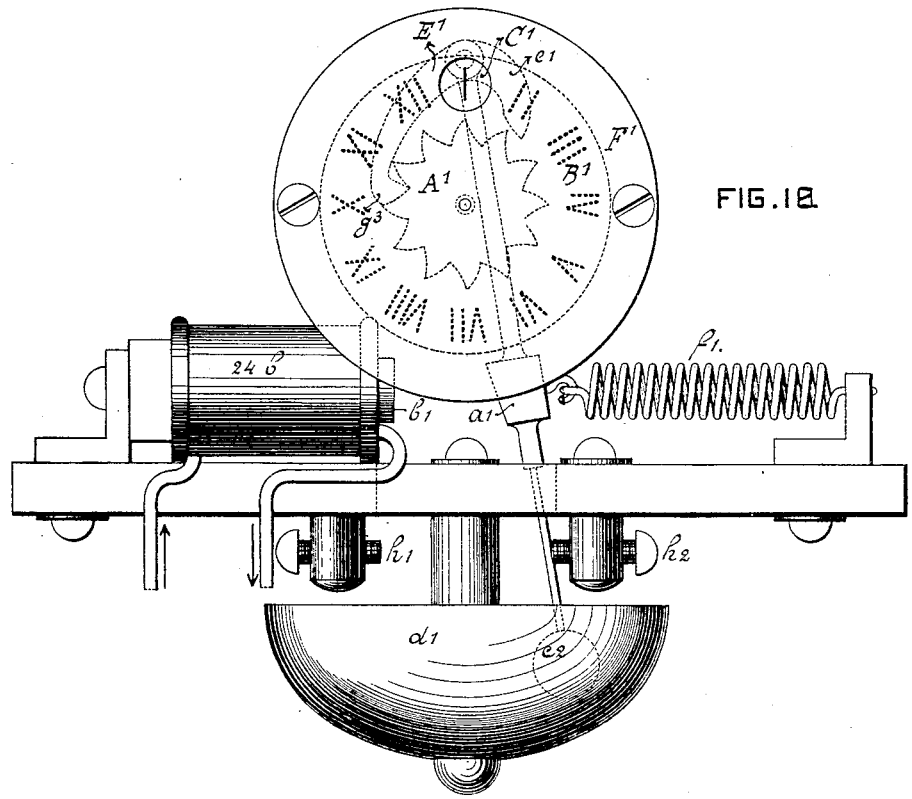
FIG.18.
FIG.19.
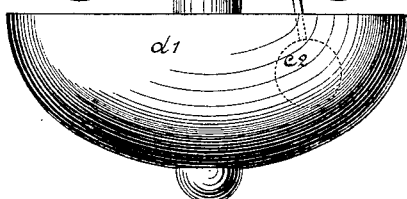
FIG.20.
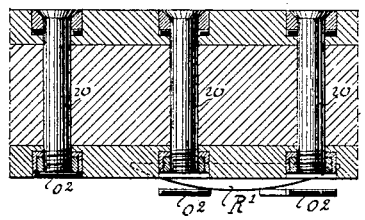
WITNESSES: INVENTOR:
J. W. Balet
BY
ATTORNEYS.

United States Patent Office.

JOSEPH W. BALET, OF NEW YORK, N. Y., ASSIGNOR OF ONE-HALF TO ROBERT DUNLAP AND LUKE F. COZANS, OF SAME PLACE.

ELECTRIC-CURRENT REGULATOR.

SPECIFICATION forming part of Letters Patent No. 398,926, dated March 5, 1889.

Application filed January 27, 1888. Serial No. 262,173. (No model.)

*To all whom it may concern:*

Be it known that I, JOSEPH WILHELMUS BALET, a subject of the King of the Netherlands, at present residing in the city, county, and State of New York, have invented a new and Improved Electric-Current Regulator, of which the following is a specification, reference being had to the annexed drawings, forming a part thereof, in which—

Figure 2:
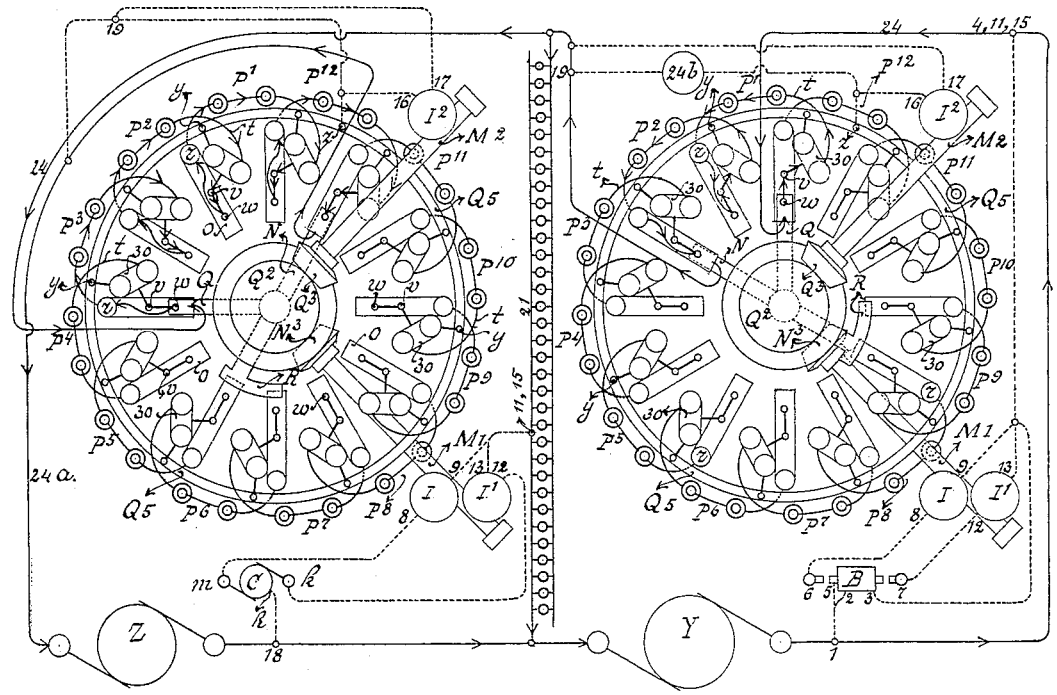
Figure 3:
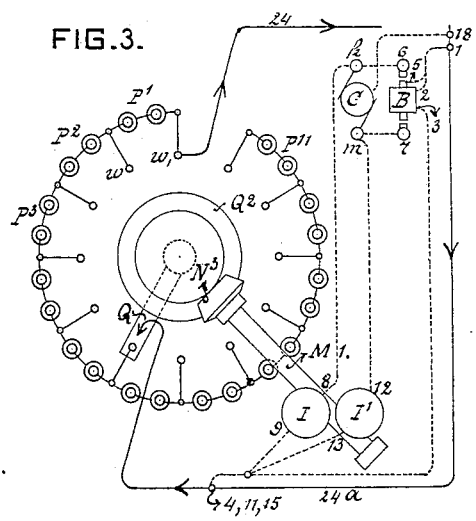
Figure 5:
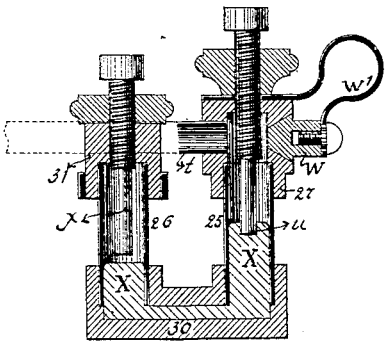
Figure 4:
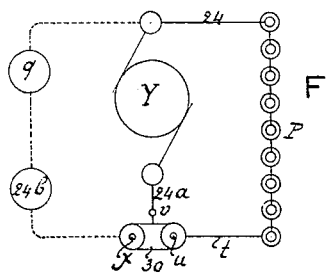
Figure 13:
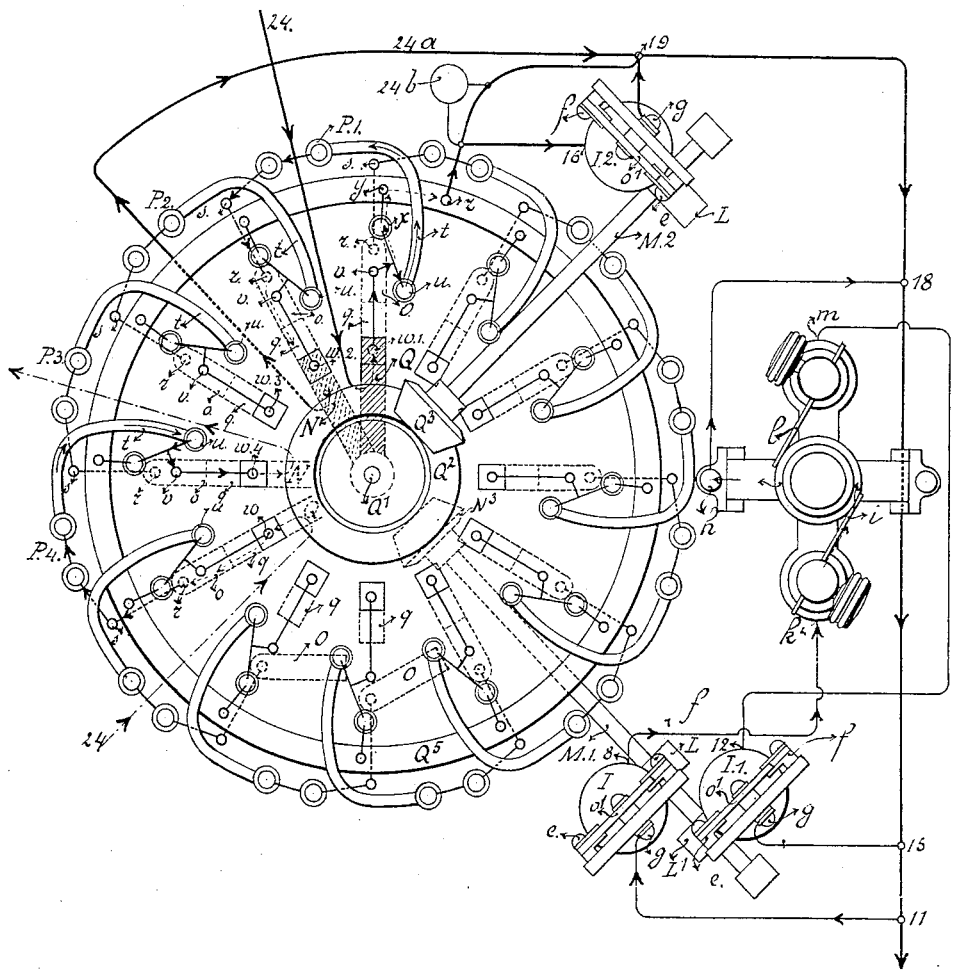
Figure 16:
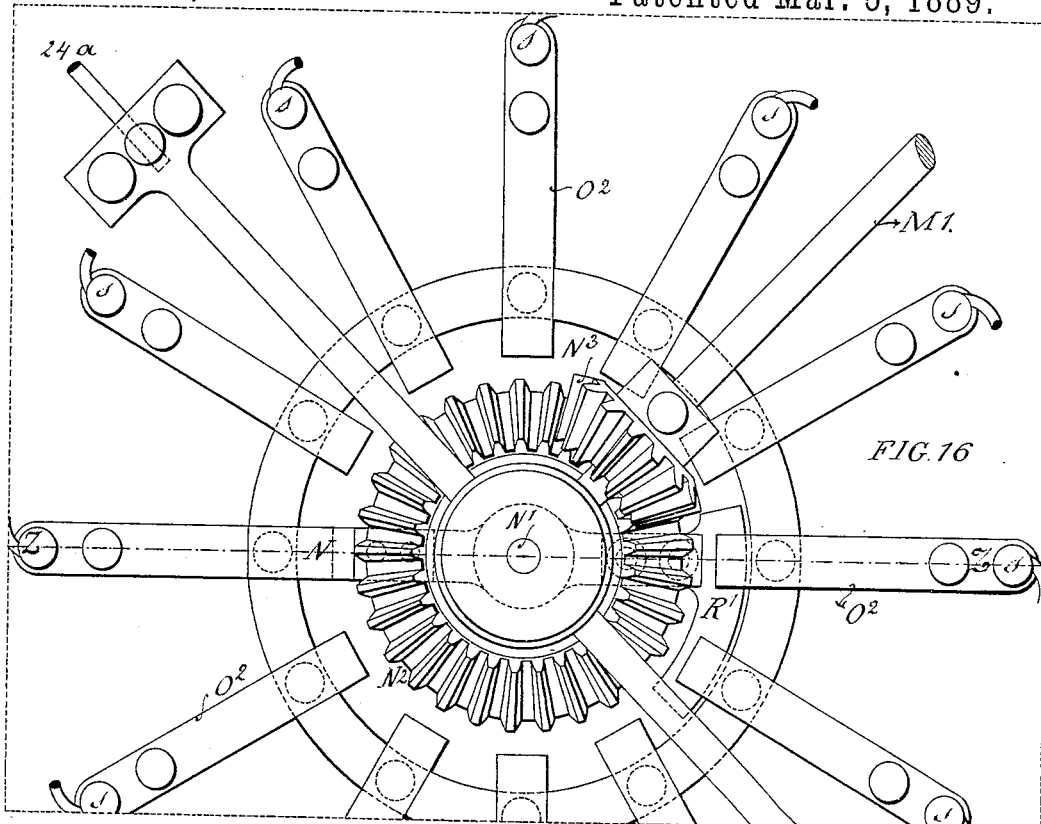
Figure 17:
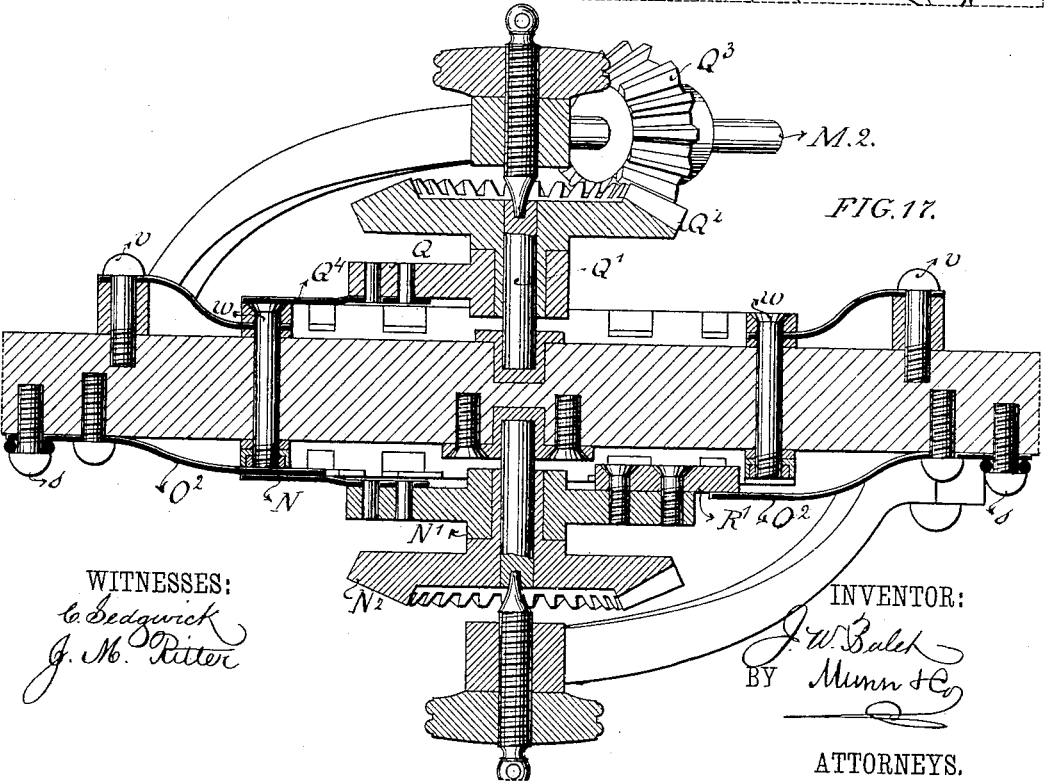

Figure 1 shows a side elevation of the circuit-controller, a side elevation of the current-regulator, a side elevation of the switch-actuating mechanism, a side elevation of auxiliary switch-actuating mechanism, and a plan view of the current-distributer and secondary batteries. Fig. 2 is a diagram of a system in which a combination dynamo, electric motor, and electric lights are regulated. Fig. 3 is a diagram in which the current of cells are regulated according to the power required. Fig. 4 is a diagram in which the storage-batteries are cut out of the circuit when they have received their maximum charge. Fig. 5 is a modification of the gas-switch. Fig. 6 is a diagram of the circuit. Fig. 7 is an enlarged vertical section of the current-regulator, taken on line A B of Fig. 8. Fig. 8 is a side elevation of the current-regulator, taken on a plane at right angles to that of Fig. 7. Fig. 9 is a longitudinal section of the circuit-controlling device shown in Fig. 1. Fig. 10 is an enlarged side elevation of one of the switch-actuating devices shown in Figs. 3 and 4. Fig. 11 is a vertical section of the same, taken on the line E F in Fig. 10. Fig. 12 shows a plan view, partly in section, of the switch operating and distributing mechanism, the section being taken on lines J K in Fig. 14 and L M in Fig. 15. Fig. 13 is a plan view of the entire apparatus, showing the relation of the several parts. Fig. 14 is a vertical section taken on line G H in Fig. 12. Fig. 15 is a vertical section taken on line *x x* in Fig. 13. Fig. 16 is a plan view of a modified form of the circuit-breaking mechanism. Fig. 17 is a vertical transverse section taken on line *z z* in Fig. 16, and Fig. 18 is a side elevation of the sounder. Fig. 19 is a transverse section of a portion of the switch. Fig. 20 is a vertical transverse section of the switch-arm.

Similar letters of reference indicate corresponding parts in all the views.

The object of my invention is to provide a current-regulator for dynamos and motors by which the current not used and any surplus of current will be sent into accumulators to be stored for future use when the main current from the dynamo becomes weakened or ceases altogether, and to control the charging of the secondary batteries, so that the charging-current shall cease in a particular battery when the maximum charge is reached and be returned to the said battery when it is discharged.

My invention also has for its object to provide a regulator for charging storage-batteries by means of an electric current from any source which will automatically include a greater or less number of storage-batteries in the circuit for charging purposes, the number of batteries being controlled by the strength of the charging-current, and to provide means for cutting storage-batteries out of the main circuit when they have received their maximum charge.

My object is, further, to provide means for regulating the number of storage-batteries included in a circuit, so that the number of charged storage-batteries will correspond with the work to be done by the batteries.

My invention consists in a series of storage-batteries and in a combination of a series of switches under control of the main current and of the motor driven by the current; also, in the combination, with the storage-batteries and current-controlling devices, of gas-actuated switches to be operated by gases generated in the storage-batteries after the maximum charge is reached; also, in the combination, with the series of storage-batteries, the current-controlling devices, and gas-actuated switches, of a switch governed by the switches under the control of the main current to prevent the series of storage-batteries from forming a closed circuit.

It also consists in a novel circuit-controller formed of a solenoid containing a movable core or armature and a spring arranged to oppose the movement of the core, the armature being provided with different sets of contacts for shifting the current when too low or too high.

It also further consists in a current-regulator connected with the motor driven by the current and arranged to operate the circuit of the switching mechanism by the centrifugal action of mercury, the said regulator being arranged to complete one circuit when the speed of the motor is too low, to complete another circuit when the speed of the motor is too high, and to hold the regulating-circuit open when the speed of the motor is normal.

It also further consists in a novel switch-actuating mechanism in which a movable core makes and breaks the circuit in its magnetizing coil by the vibratory longitudinal movement of said core, and causing to turn a roller and shaft by friction caused by magnetic induction between said core and said roller.

It also further consists in novel switch mechanism operated by the switch-actuating mechanism in which two independent switch-arms are arranged to touch the same or different contact points of a switch-board, thus shifting their positions relative to each other, thereby cutting out the storage-batteries, so that they will not receive the charging-current, or including them in the main circuit for the purpose of charging or switching the storage-batteries already charged into the main circuit to assist the main current in doing its work.

It also consists in a mercurial circuit-operating device formed of two communicating vessels, insulated contact-screws entering the said vessels, a body of mercury contained in the communicating vessels, pipes connected with the storage-batteries and with one of the vessels for conveying gas from the storage-battery to the vessel and thus changing the level of the mercury, so as to shift the electric contacts, and in the combination, with one of the communicating vessels, of a valve and valve-operating mechanism for releasing the gas and thus restoring the mercury to its normal position.

It also further consists in an escapement operated by an electro-magnet which is excited when the switch above mentioned works the said escapement, having a plate with as many numbers as there are sets of storage-batteries connected with the regulator, the said plate being arranged to expose the number corresponding with the filled set of storage-batteries, at the same time giving an audible signal.

I will proceed to describe the different parts of my apparatus in detail, after which I will describe their connection with each other and their mode of operation.

The electrical connections shown in the drawings are intended when a very heavy current is flowing through the main conductor. I do not, however, confine myself to such, for the connections are to be made according to the strength of the current flowing through the main conductor.

In Figs. 1 and 9 is shown a circuit-controller, which is dependent for its action upon the main current. It consists of a solenoid, B, provided with a tubular core, B', to which is fitted a soft-iron armature, A. The ends of the tubular core B' are closed, with the exception of a small central opening, through which project the rods $a$ $b$ from the ends of the armature A. Surrounding the rod $a$, and between the armature A and the closed end of the tubular core B', there is a spiral spring, $B^2$, which opposes the inward movement of the armature A. Opposite the end of the rod $a$ is supported a contact-screw, $c$, by a standard, $c'$, secured to the insulating-support A', and opposite the rod $b$ is supported a contact-screw, $d$, by the standard $d'$, also secured to the insulating-base A'. The terminals 2 3 of the solenoid B are connected with the main conductor $24^a$ at 1 and 4. A branch of the terminal 2 is connected electrically by the screw 5 with the core B' of the solenoid, and is thus in electrical communication with the armature A and rods $a$ $b$. The standards $c'$ $d'$ are provided with binding-screws 6 7. When the current in the main conductor $24^a$ energizes the solenoid B, so that the armature A is held in equilibrium, as shown in the drawings, no contact is made between the rods $a$ $b$ and the screws $c$ $d$; but when the current is too strong the armature A is drawn into the solenoid against the pressure of the spring $B^2$ and causes the rod $a$ to make a contact with the screw $c$. When the current is too weak, the armature A is released and the spring $B^2$ carries the armature A forward, so as to bring the rod $b$ into contact with the screw $d$.

In Figs. 1, 7, and 8 is shown a centrifugal governor, which is operated by the motor driven by the current from the main conductor $24^a$, said motor being indicated by Z in Fig. 2. To the motor is secured a frame, D, containing a spindle, D', carrying at its lower end a pinion, $D^2$, which is engaged by a bevel-wheel, $D^3$, on the shaft $D^4$ of the electric motor. To the upper end of the spindle D' is secured a head, E, to which is attached a hollow cylindrical shell, E', of insulating material, the upper end of the shell being rabbeted to receive the metallic ring H, and to the rabbeted upper edge of the metallic ring is secured an insulating-ring, H', which supports a cap, G, in the center of which is placed the contact-screw F. The receptacle thus formed contains a body, F', of mercury, and the space above the mercury in the chamber C is filled with mercurial vapors, which prevent the metal from being burned by sparking between the contact. The mercurial vapor is generated by heat, the mercury being poured into the chamber C while hot through the hole in which the contact-screw F is insulated. After the mercury is poured in and before it cools the screw F is inserted and the jam-nut on the said screw is tightened, thereby practically sealing the mercury in the chamber C. The vapor from the hot mercury drives out all the air, and when most of the vapor has condensed there is a partial vacuum in the chamber C containing mercury vapor only. To the cross-arm $H^2$ are secured two vertical posts, $H^3$ $H^4$, which are insulated from the cross-arm and are provided with binding-screws $k$ $m$. The posts $H^3$ $H^4$ are mortised tranversely at their upper ends, and the post $H^3$ supports a brush, $i$, which touches the metallic ring H, and in the mortise of the post $H^4$ is secured a brush, $l$, which touches the metallic cap G. The frame D is provided with a binding-screw, $h$. When the motor is revolving at its normal speed, the mercury in the chamber C assumes the form indicated by the line $n$, and the circuit remains open; but when the speed of the motor rises above the normal the mercury assumes the form indicated by the dotted line $n'$ and establishes communication between the metallic ring H and the spindle D′, and when the speed falls below the normal the mercury assumes the form indicated by the dotted line $n^2$, thus establishing a contact between the end of the screw F and the spindle D′.

In Figs. 1, 10, and 11 are shown the switch-actuating devices, which are exactly alike, the parts being indicated by the same letters of reference, so that a description of one will answer for all. To the solenoid I is fitted a movable core or armature, K, provided with the rod K′, extending through a cap, $K^2$, and carrying at its upper end a flat spring, $p$. To the frame $K^3$, attached to and extending above the top of the solenoid, is pivoted a switch-lever, $o'$, which is capable of making contact with either of the contact-pieces $e$ $f$. The lever $o'$ is provided with a rectangular projection, $g'$, and with notches $g^2$ at opposite sides of the said rectangular projection. The angle of the projection is opposite the pivot $g$, and when the armature K rises, being magnetized by the passage of the current through the solenoid I, it causes the spring $p$ to enter one of the notches $g^2$ and push the lever $o'$ into contact with one of the contact-pieces $e$ $f$. When the armature K again rises, it causes the spring $p$ to engage the other notch $g^2$ and shift the lever $o'$ to the other connection. In this manner the lever $o'$ alternates in its movement with every upward stroke of the armature K and makes and breaks the circuit of the solenoid I. The armature K is prolonged below the solenoid I, and is flattened for engagement with a roller, L, of magnetic material, mounted upon the shaft M′. Whenever the armature K is magnetized by the current passing through the solenoid I, the said armature is moved upward, and, the roller L being magnetized by induction from the armature K, the frictional contact thus established causes the roller L to turn whenever engaged by the armature in the manner indicated. While the current passes through either of the solenoids in Fig. 1, the armature K keeps up a continual longitudinal vibration, shifting the lever $o'$ alternately from one of its electrical contacts to the other and turning the roller L and shaft M in the direction indicated by the arrow. (See Fig. 1.) When the bar $b$ of the controller B makes contact with the contact-point $d$, or when the body of mercury in the centrifugal regulator makes contact with the screw F, and the current flows through the brush $l$ and post $H^4$ to the contact-screw $m$, the current enters the coil I′ at 12, and the armature K vibrates. When the bar $a$ makes contact with the contact-point $c$ of the controller or the body of mercury in the centrifugal regulator makes contact with the brush $i$, and the current can flow through the post $H^3$ to the connection $k$, the current enters the coil I at 8, and the armature K of said coil vibrates. The connections made between the controller, the main current, and the coil I′ and I are shown with dotted lines, and the connections between the centrifugal regulator, the main current, and the coil I′ and I are shown with solid lines.

The switch operating and distributing mechanism shown in Figs. 12, 14, 16, and 17 is provided with a series of contacts, $w$, which extend through the frame of the machine and are arranged to be touched upon their upper ends by the arm Q and upon their lower ends by the arm N. The arms N Q are placed upon shafts N′ Q′, which are axially in line with each other, but insulated from each other. The shaft Q′ is provided with a bevel-wheel, $Q^2$, which is engaged by a bevel-pinion, $Q^3$, on a shaft, $M^2$, journaled in the frame of the machine and extending beyond the said frame, where it is provided with the iron roller L, which is engaged by the armature K of the solenoid $I^2$, as shown in Figs. 1 and 13. Upon the shaft N′, which carries the arm N, is placed a bevel-wheel, $N^2$, which is engaged by a bevel-pinion, $N^3$, on the shaft M′, the said shaft extending beyond the frame of the machine, where it is provided with two iron rollers, L L′, the roller L being engaged by the armature K of the solenoid I, and the roller L′ being engaged by the armature K of the solenoid I′, as shown in Figs. 1 and 13.

The arms N Q receive the current from the conductor 24 through the medium of their shafts, as shown in Figs. 16 and 17. The conductor $24^a$ is connected with the frame, and the current goes from the frame to the shaft N′, thence to the arm N. A modification of this connection is shown in Fig. 20, in which the conductor 24 is connected with the shaft N′, and the spring-arm N makes contact with the conductor 24 and contacts $w$.

With each contact $w$ is connected a plate, $q$, which extends radially from the contact, and upon the radial line of each plate $q$ is journaled a shaft, $r$, which carries a toothed sector, S, and the switch-arm O, insulated from the sector S. Each switch-arm O is connected with a spiral spring, T, which is attached to the bar T′, forming a conductor for the current from the shaft $r$ to the binding-screw $s$. The arm N carries a beveled sector, R, which is capable of engaging all the sectors S and of turning them so as to throw the switch-lever O out of contact with the plates $q$. After the sector R passes one of the sectors S the spring T returns the sector to its normal position, with the switch-lever O in contact with the plate $q$. This mechanism prevents the storage-batteries from being short-circuited or having the circuit closed upon themselves.

In the plan of the switch-board of Fig. 1 the connection of the storage-batteries with the contacts $w$ must be continuous or no continuous operation of the regulator can be obtained, for when there is a point to start there is a point to finish, and without the contact-breaking mechanism the storage - batteries should make a closed circuit, their current flowing from contact $w'$ through the plate $q$ and switch-arm O to the shaft $r$, (see the dotted lines in said figure,) then to the pole $s$, to the storage-batteries $P^{12}$, through the tube $t$, the contact-screw $u$ of the gas-switch, through the mercury of the gas-switch to the pole $v$, and from there to the contact $w^{12}$, and following the same way through the storage-batteries $P^{11}$ $P^{10}$, &c., and so all around. The dotted lines in the drawings show how the contact between the plate $q$ and switch-arm O is broken, thus breaking the contact between $w^{12}$ and $P^{11}$. Two contacts are always broken, as shown, between $w^{12}$ and $P^{11}$ and between $w^{11}$ and $P^{10}$ to prevent dangerous sparking.

With each contact $w$ is connected electrically a valve, 30, by a wire running from the said contact to the binding-screw $v$. Each valve is provided with a base-piece, in which are inserted tubes 25 26, of insulating material, and in the base-piece is formed a passage connecting the two tubes. To the top of the tube 25 is fitted a cap, 27, in which is inserted a screw, $u$, and also a pipe, $t$, communicating with the interior of the tube, and in that side of each valve which adjoins the central part of the device is formed a valve-seat, to which is fitted a valve, W, the said valve W being connected with the spring-lever W', pivotally supported by the arm 28, the lower end of the lever W' being provided with a convex wearing-plate, V, of insulating material, which is engaged by the curved end U of the arm Q. The lever W' is pressed by a spring, 29, which tends to open the valve W. The tube 26 is provided with a cap, 31, to which is fitted a screw, $x$, extending downward in the insulating-tube 26. The lower part of each tube 25 26 and the passage communicating between the two tubes is filled with a body, X, of mercury. The space over the mercury in the tube 26 contains air under sufficient pressure to press the mercury out of contact with the screw $x$ and to cause it to make contact with the screw $u$. The base in which the tubes 25 26 are inserted being of conducting material, the current can pass from the binding-screw $v$ to the mercury. The space above the mercury in the tube 25 communicates through a pipe, $t$, with the storage-batteries connected with the same contact, $w$, that communicates with the valve 30.

In the branch $Z^{19}$ of the auxiliary main circuit (shown in Figs. 2 and 13) is connected a sounder, $24^b$, which indicates when a set of storage-batteries have received their maximum charge, showing at the same time which set is charged by displaying a number. A side elevation of the sounder is shown in Fig. 18. When a current flows through the coils $24^b$, the armature $a'$ is attracted by the cores $b'$ of the electro-magnet, and the hammer $c^2$ strikes the bell $d'$, and the arm $e'$ of the anchor E' pushes the scape-wheel A' forward one tooth. To the scape-wheel A' is attached the plate B', having as many figures as there are sets of storage-batteries, the number of figures also corresponding with the number of teeth of the scape-wheel. When the current ceases to flow through the the coil $24^b$, the spring $f'$ returns the armature and bell-hammer to strike the bell on its back - stroke, and the anchor moves the scape-wheel another notch, bringing another figure into view. The throw of the hammer and armature are regulated by the screws $h'$ $h^2$.

Surrounding the distributing apparatus is a series of storage-batteries, P' to $P^{12}$, inclusive. (See Figs. 1 and 2.) The current arrives at the distributer through the conductor 24, which communicates with the arm Q, and the current passes from the arm Q to the contact $w$, thence to the binding-screw $v$ of the valve 30, thence through the mercury, X, to the screw $u$, and through the pipe $t$ to the storage-battery P', which may consist of a number of cells, thence through the shaft $r$, through the switch-lever O, through the contact-plate $q$ and contact $w$ to the lever N, thence by the conductor $24^a$ back to the generator. The solenoid $I^2$ is placed in the shunt $z^{19}$ between the frame $Q^5$ and the main conductor $24^a$. When the storage-battery P' becomes charged, it begins to give off gas, which passes through the pipe $t$ and presses upon the surface of the mercury, X, in the tube 25, causing it to recede from the point of the contact-screw $u$ and make contact with the screw $x$. (See also Fig. 14.) By this means the current is switched out of the battery-circuit and into the circuit of the solenoid $I^2$, the current passing from the binding-screw $v$ through the mercury, X, contact-screw $x$, binding-post $y$, and frame $Q^5$ partly to the terminal 16 of the solenoid $I^2$, when the armature K of the solenoid begins immediately to vibrate and turn the shaft $M^2$, so as to cause the arm Q to pass on to the next contact $w$, and at the same time to close the next valve, W, in order by the engagement of the wearing-plate V with the curved end U of the arm Q. (See also Fig. 12.) After passing the valve 30, belonging to the storage-battery first charged, the curved end U of the arm Q passes the wearing-plate V of the spring W' and allows the valve W connected therewith to open, allowing the gas to escape, thus permitting the mercury to return to its normal position in contact with the screw $u$; also, during the operation of the solenoid $I^2$ a current will pass through the sounder $24^b$ in Figs. 2 and 13, and a number is indicated showing which set of storage-batteries is charged. So long as the current in the main circuit is normal, or the speed of the motor is normal, the current arrives at the distributer through the conductor 24, which communicates with the arm Q, and the current passes from the arm Q to the contact $w$, thence to the arm N, and through the conductor $24^a$ back to the generator.

So long as the current in the main circuit is above the normal the rod $a$ in the controller shown in Figs. 1, 2, and 9 remains in contact with the screw $c$, and so long as the speed of the motor is so high as to cause the mercury, F', contained in the regulator shown in Figs. 2 and 7 to make contact with the ring H the current flows through the solenoid I, and the vibratory motion of the armature K of the said solenoid causes the shaft M' to revolve in the manner already described, constantly turning forward the arm N and bringing in more and more storage-batteries, P' P², &c., until the current is reduced to its normal state, when the armature A occupies the position of equilibrium between the points $c$ $d$, and the mercury in the receptacle C takes the form indicated by the line $n$. Then the current ceases to flow through the solenoid I, and the arm N remains stationary. When the speed of the motor is reduced so that it is less than normal, it causes the mercury, F', contained in the regulator to make contact with the screw F, and when the current falls below the normal, the armature A in the circuit-controller being released, the spring B² carries the armature forward, so that the rod $b$ makes contact with the screw $d$, and the current flows through the solenoid I', when the armature of the said solenoid, by engagement with the roller L' on the shaft M', causes the arm N to move in a reverse direction, and the storage-batteries are shut out. If, then, the arm continues its motion, the position of the arms N Q relative to each other is shifted, and the current flows in the opposite direction, as indicated at the left of Fig. 2, which coincides with the direction of the current of the storage-batteries, thus assisting the main current in doing its work. In this manner the current is diverted into the secondary batteries, P' P² P³, &c., and a larger or smaller number of batteries are switched in, depending on the requirements of the circuit, as indicated by the controller B and the regulator C. (Shown in Fig. 2.)

In the modified form of the circuit-breaking mechanism shown in Figs. 16, 17, and 19 the arm N carries a sector, R', of non-conducting material and having a curved surface, which sector slides over the contact-springs O² and raises them from the contacts $w$ in alternation. After the sector R' passes one of the contact-springs O² the said spring O² returns to its normal position and touches the contact $w$. Thus the secondary batteries are prevented from being short-circuited or having the circuit closed within themselves.

In Fig. 6 is shown an arrangement in which Y represents the source of electricity; 22, the current-controller; 23, the switch actuating and distributing mechanism and the sets of storage-batteries. Z is the electric motor. 20 is the regulator, with the sounder $24^b$ omitted, and 21 represents a series of lamps.

When it is desired to charge storage-batteries only, the controller shown in Figs. 1 and 9 is substituted for the centrifugal regulator, and in Fig. 2, at the left hand, is shown the device for this purpose. The current enters into the regulator by the conductor 24 to the arm Q, flows in the manner formerly described through the sets of storage-batteries P' and P² upon the arm N, and from the arm N back to the dynamo Y, while the controller B and the switch-actuating device (indicated by I I') regulate the number of batteries changed, and the valve 30 and switch-actuating mechanism (indicated by I²) disconnect the batteries which have received their maximum charge from the circuit. The sounder $24^b$ then indicates alternately which set of storage-batteries is fully charged. At the left hand of the same figure is shown how the sets of batteries P³, P², P', and P¹² help the dynamo to run the motor Z. The lamps 21 are shut in the circuit. Said lamps offering less resistance than the motor Z, they will absorb the largest portion of the current of the generator Y. This arrangement also demonstrates how the accumulators are able to maintain an equal light in the lamps 21 when the dynamo slows down and comes at last to a stop. When storage-batteries or any other batteries constitute the source of electricity and the number switched into the circuit requires to be controlled, the arrangement shown in Fig. 3 is used. The solenoid I², the shaft M², the pinion Q³, the bevel-wheel N², the arm N, the shaft N' and its frame, the gas-switches, the sounder $24^b$, and the contact-breaking mechanism can be dispensed with. The pinion N³ engages the bevel-wheel Q², and the centrifugal regulator shown in Figs. 1 and 7 or the current-controller shown in Figs. 1 and 9 can be used. The cells P' P², &c., are directly connected with the contacts $w$, and to prevent short-circuiting the cells P¹² are left out. The conductor 24 is connected with the contact $w'$, and the conductor $24^a$ is connected with the arm Q. When more cells are wanted in the circuit, the arm Q is moved forward by the operation of the armature K of the solenoid I', and successively the cells P' P², &c., are shut into the circuit.

When the armature K in the solenoid I vibrates, the arm Q moves back and the cells are successively shut out.

When it is desired during the charging of storage-batteries to be informed when they have received their maximum charge, the sounder and a resistance-coil can be used in combination with the gas-switch, in which for that purpose the valve W and the spring W' are not pivoted on their support 28, and the valve W operates as a safety-valve. This modification is shown in Figs. 4 and 5. The current passes from the electrical source to the pole $v$, through the mercury, X, the screw $u$, and the tube $t$ to the storage-batteries, and from these back to the electrical source, and when the storage-batteries have received their maximum charge the connection with the screw $u$ is broken and the connection is made with the screw $x$, and the current flows from its source to the pole $v$, through the mercury, X, the screw $x$, the sounder, and the resistance-coil, and back to the electrical source.

The advantages of my improvement are that, in switching-in resistance, consisting of storage-batteries for the controlling of the current in the main circuit, I am enabled to conserve the current for future use to assist the main current, or for use independently of the main current.

My improvement finds one of its principal applications in electric systems where electric power is distributed during the day and electric lighting is effected in the evening by the same generator or by the same circuit. By controlling the current during the day by the use of the storage-batteries I am enabled during the interval between the early hours of evening and the closing hours of work to supply sufficient current to the main circuit to supplement the current from the dynamos on the circuit, so as to maintain a practically uniform current, although lights and motors may be running at the same time; and when the evening advances the electric plant gradually acquires more energy than is utilized in producing the light, and this surplus of energy with my system can be used for charging storage-batteries for independent purposes—for example, for propelling street-cars. In addition to the uniform flow of current secured by my improvement, I effect a more thorough and equal regulation of the motor, and I avoid overstraining the dynamo by frequent and great fluctuations in the current. Another advantage is that I supplement the current from the dynamos at the place where the current is most needed. My improved governing device switches into the circuit the exact number of storage-batteries required to assist the main current or to do the work done by the main current. Another advantage is that I waste no current whatever for governing purposes, and I bring the use of the current to the highest point of economy, enabling me to gain so much that I am able to compete successfully in the generation and distribution of power with small steam-engines—say from one to ten horse-power.

When my governing apparatus is applied to the charging of storage-batteries only, I secure the following advantages: first, the avoidance of overcharging the batteries and wasting energy; second, the avoidance of the batteries overpowering the generator and changing the polarity of the generator; third, avoiding the burning of the armature of the generator by short-circuiting, and, fourth, that the apparatus indicates that the storage-batteries are charged.

When my governing apparatus is applied in those cases where batteries constitute the source of electricity, I secure the advantage of wasting no energy. By my improved gas-switch the storage-batteries are not overcharged, and the apparatus informs the attendant when the batteries have received their maximum charge.

Having thus described my invention, I claim as new and desire to secure by Letters Patent—

1. In a regulator for dynamos and electric motors, the combination of the following elements, viz: a controller actuated by a current derived from the main circuit and adapted to complete another circuit when the main current is too weak or too strong, mechanism governed by the controller for operating the switches, and a series of storage-batteries arranged to receive the current of the main circuit through the switch-operating mechanism when the main current is too strong and to deliver a current from the storage-batteries to the main circuit when the main current is too weak, substantially as specified.

2. In a regulator for dynamos and electric motors, the combination of the following elements, viz: a centrifugal regulator connected with the motor driven by a current derived from the main circuit and adapted to complete another circuit when the main current is too weak or too strong, mechanism governed by the regulator for operating the switches, and a series of storage-batteries arranged to receive the current of the main circuit through the switch-operating mechanism when the main current is too strong and to deliver a current from the storage-batteries to the main circuit when the main current is too weak, substantially as specified.

3. In a regulator for dynamos and electric motors, the combination of the following elements, viz: a controller actuated by a current derived from the main circuit, and a centrifugal governor connected with the motor driven by the main current, and both adapted to complete another circuit when the main current is too weak or too strong, mechanism governed by the controller for operating the switches, a second set of switches, mechanism governed by the centrifugal regulator for operating the second set of switches, and a series of storage-batteries arranged to receive the current of the main circuit through the switching mechanism when the main current is too strong and to deliver a current from the storage-batteries to the main circuit when the main current is too weak, substantially as specified.

4. In a regulator for dynamos and electric motors, the combination of the following elements, viz: a controller actuated by a current derived from the main circuit and adapted to complete another circuit when the main current is too weak or too strong, switch-actuating mechanism governed by the controller, switches operated by the switch-actuating mechanism, switches operated by gas, a sounder adapted to indicate that the storage-batteries are charged, and a series of storage-batteries arranged to receive the current of the main circuit through the switching mechanism when the main current is too strong and to deliver a current from the storage-batteries to the main circuit when the main current is too weak, substantially as specified.

5. In a regulator for dynamos and electric motors, the combination of the following element, viz: a centrifugal regulator actuated by a motor driven by the main current and adapted to complete another circuit when the main current is too weak or too strong, switch-actuating mechanism governed by the regulator, switches operated by the switch-actuating mechanism, switches operated by gas, and a series of storage-batteries arranged to receive the current of the main circuit through the switching mechanism when the main current is too strong and to deliver a current from the storage-batteries to the main circuit when the main current is too weak, substantially as described.

6. In a regulator for dynamos and electric motors, the combination of a controller actuated by a current derived from the main circuit, a centrifugal regulator driven by a motor operated by the main current, the controller and regulator both being adapted to complete other circuits when the main current is too weak or too strong, switch-actuating mechanism governed by the controller and switch-actuating mechanism governed by the regulator, switches operated by the switch-actuating mechanism, switches operated by gas, a sounder arranged to be operated when the storage-batteries are charged, and a series of storage-batteries arranged to receive the current of the main circuit through the switching mechanism when the main current is too strong and to deliver a current from the storage-batteries to the main circuit when the main current is too weak, substantially as described.

7. In a current-regulator, the combination of the following elements, viz: a controller actuated by a current derived from the main circuit and adapted to complete another circuit when the main current is too weak or too strong, switch-actuating mechanism governed by the controller, switches operated by the switch-actuating mechanism, a series of storage-batteries arranged to receive the current of the main circuit through the switching mechanism, so as to make equilibrium between the main or charging current and the current of the storage-batteries, gas-actuated switches arranged to cut out of the main circuit the storage-batteries which have received their maximum charge, and a sounder for indicating that a storage-battery or set of storage-batteries has received its maximum charge, substantially as described.

8. In a current-regulating system, the combination of the following elements, viz: a series of storage-batteries arranged to receive a charging-current, a gas-actuated switch operated by the batteries, and a sounder operated from the said switch and indicating when the batteries have received their maximum charge, substantially as described.

9. In a current-regulator, the combination of a controller actuated by a current derived from the main circuit and adapted to complete another circuit when the main current is too weak or too strong, switch-actuating mechanism governed by the controller, a switch operated by the switch-actuating mechanism, and a series of cells arranged to send their current into the main circuit, the whole being constructed to switch into the main circuit the number of cells corresponding to the work to be done, substantially as described.

10. In a current-regulating system, the combination of a centrifugal regulator operated by a motor driven by the main circuit and adapted to complete another circuit when the main current is too weak or too strong, switch-actuating mechanism governed by the centrifugal regulator, a switch operated by the switch-actuating mechanism, and a series of cells arranged to send their current into the main circuit, the device being constructed to switch into the main circuit a number of cells corresponding to the work to be done, substantially as described.

11. In a current-regulating system, a controller formed of the solenoid B, provided with the tubular core B', the armature A, placed in the tubular core and provided with contact-points $a$ $b$, the spring B², arranged to oppose the action of the solenoid on the armature, and the contact-points $c$ $d$, substantially as described.

12. In a current-regulating system, the combination, with circuit-controlling and switching mechanism, of one or more solenoids, I, each provided with a switching mechanism, a core, K, a roller, L, of magnetic material, adapted to be magnetized by induction from the core K and to be turned by the longitudinal movement of the said core, and means, substantially as herein described, for shifting the current passing through the solenoids, so as to cause the core K to vibrate longitudinally and turn the roller L, subtatntially as described.

13. In a current-regulating system, the combination of a series of contacts, $w$, arranged in a circle, and an automatically-operated switch-arm, Q, moving periodically in one direction over the said contacts, substantially as described.

14. In a current-regulating system, the combination of a series of contacts, $w$, arranged in a circle, and the switch-arms N Q, moving independently of each other over the contacts, the arm Q moving periodically in one direction and the arm N in both directions, substantially as described.

15. In a current-regulating system, the combination of a series of contacts, $w$, contact-springs engaging said contacts, and the sector R', sliding over the said contact-springs to break the contact between the said springs and contacts $w$, substantially as described.

16. In a current-regulating system, the combination of a series of contacts, $w$, arranged in a circle, the contact-springs $O^2$, the automatically-operated switch-arm N, moving over said contacts, and the sector R', carried by the said switch-arm and sliding over the springs to break the contact between the said springs and the contacts $w$, substantially as described.

17. In a current-regulating system, the combination, with a storage-battery and conductors carrying the charging-current, of a switch formed of the communicating tubes 25 26, of insulating material, the mercury, X, contained by the tubes, the contact-screws $u$ $x$, entering the tubes, and the pipe $t$, communicating with the storage-battery and adapted to convey gas to the tube 25, the tube 26 being filled with air under pressure, substantially as and for the purpose specified.

18. The combination, with the communicating tubes 25 26, the contact-points $u$ $x$, inserted therein, and the pipe $t$, communicating with the tube 25, of the valve W, supported on a spring-arm and adapted to shut the gas in the tube 25, and the arm Q, provided with the curved end U, adapted to hold the valve W closed, substantially as described.

19. The combination, with the communicating tubes 25 26, the contact-points $u$ $x$, inserted therein, and the pipe $t$, communicating with the tube 25, of the valve W, closed by a spring-arm, W', the said spring-arm being adapted to operate the valve W as a safety-valve for the relief of pressure within the tube 25, substantially as described.

20. The combination, in a current-regulating system, of a series of storage-batteries and mechanism, substantially as specified, for switching the storage-batteries into the main circuit for charging and switching the storage-batteries out of the main circuit after charging, and a sounder to indicate when and which set of storage-batteries are charged, substantially as described.

21. In a current-regulating system for dynamos and electric motors, the combination of the distributing mechanism provided with the contacts $w$, the arms N Q, adapted to convey the current to different contacts, the sector R', springs $O^2$, the storage-batteries P' $P^2$, &c., the valves 30, the bevel-wheels $Q^2$ $N^2$, the bevel-pinions $Q^3$ $N^3$, engaging the said bevel-wheels, the shafts M' $M^2$, provided with rollers L L', the centrifugal regulator connected with the motor driven by the main current, and the electrical connections, substantially as described.

22. In a current-regulating system for dynamos and electric motors, the combination of the distributing mechanism provided with the contacts $w$, the arms N Q, adapted to convey the current to different contacts, the sector R', springs $O^2$, the storage-batteries P' $P^2$, &c., the valves 30, the bevel-wheels $Q^2$ $N^2$, the bevel-pinions $Q^3$ $N^3$, engaging the said bevel-wheels, the shafts M' $M^2$, provided with the rollers L L', the controller operated by a current derived from the main circuit, and the electrical connections, substantially as specified.

23. In a current-regulating system, the combination of a series of storage-batteries, switches actuated by a current derived from the main circuit, switches actuated by gas developed in the storage-batteries which have reached their maximum charge, and a sounder for indicating that the storage-batteries have received their maximum charging, substantially as described.

24. In a current-regulating system for dynamos and electric motors, the combination of the distributing mechanism provided with the contacts $w$, the arms N Q, adapted to convey the current to different contacts, the sector R' and contact-springs $O^2$, the storage-batteries P' $P^2$, &c., the valves 30, the bevel-wheels $Q^2$ $N^2$, the bevel-pinions $Q^3$ $N^3$, engaging the said bevel-wheels, the shafts M' $M^2$, provided with the rollers L L', the solenoid $I^2$, with switching mechanism and armature K, connected with the roller L, the solenoids I I', with switching mechanism and armatures K, connected with the rollers L L', the controller actuated by a current derived from the main circuit, the sounder, and the electrical connections, substantially as described.

25. In a current-regulating system for dynamos and electric motors, the combination of the distributing mechanism provided with the contacts $w$, the arms N Q, adapted to convey the current to different contacts, the sector R' and contact-springs $O^2$, the storage-batteries P' $P^2$, &c., the valve 30, the bevel-wheels $Q^2$ $N^2$, the bevel-pinions $Q^3$ $N^3$, engaging the said bevel-wheels, the shafts M' $M^2$, provided with the rollers L L', the solenoid $I^2$, with switching mechanism and armature K, connected with the roller L, the solenoids I I', with switching mechanisms and armatures K, connected with the rollers L L', the centrifugal regulator connected with the motor driven by the main current, and the electrical connections, substantially as described.

26. In a current-regulating system for dynamos and electric motors, the combination of distributing mechanism provided with the contacts $w$, the arms N Q, adapted to convey the current to different contacts, the sector R' and contact-springs $O^2$, the storage-batteries P' $P^2$, &c., the valves 30, the bevel-wheels $Q^2$ $N^2$, the bevel-pinions $Q^3$ $N^3$, engaging the said bevel-wheels, the shafts M' $M^2$, provided with the rollers L L', the solenoids $I^2$, with switching mechanisms and armatures K, connected with the rollers L, the solenoids I I', with switching mechanisms and armatures K, connected with the rollers L L', the centrifugal regulator connected with the motor driven by the main current, the controller actuated by a current derived from the main circuit, the sounder, and the electrical connections, substantially as described.

27. In a current-regulating system, the combination of the distributing mechanism provided with the contacts $w$, the arm Q, adapted to convey the current to different contacts, the cells P' $P^2$, &c, the bevel-wheel $Q^2$, the bevel-pinion $N^3$, engaging the said bevel-wheel, the shaft M', provided with the rollers L L', the solenoids I I', with switching mechanisms and armatures K, connected with the rollers L L', the controller actuated by a current derived from the circuit of the cells, and the electrical connections, substantially as described.

28. In a current-regulating system, the combination of the distributing mechanism provided with the contacts $w$, the arm Q, adapted to convey the current to different contacts, the cells P' $P^2$, &c., the bevel-wheel $Q^2$, the bevel-pinion $N^3$, engaging the said bevel-wheel, the shaft M', provided with the rollers L L', the solenoids I I', with switching mechanisms and armatures K, connected with the rollers L L', the centrifugal regulator connected with the motor driven by the current of the said storage-batteries, and the electrical connections, substantially as described.

29. In a current-regulating system, a centrifugal regulator formed of the spindle D', the head E, the ring E', of insulating material, attached to the head, the ring H, of conducting material, carried by the ring E', the ring H', of insulating material, carried by the ring H, the cap G, of conducting material, the contact-screw F, inserted in the cap G, the body F', of mercury, contained by the receptacle, and the contact-brushes $i$ $l$, touching the ring H and cap G, substantially as specified.

30. In a current-regulator, the combination, with the contact-screw F and the body, F', of mercury inclosed in the receptacle C, of a filling of mercurial vapor contained by the chamber C above the mercury for the prevention of sparking between the contact-screw F and the mercury, F', substantially as specified.

JOSEPH W. BALET.

Witnesses:
EDGAR TATE,
EDWD. M. CLARK.